US012634071B2

(12) United States Patent
Hugl et al.

(10) Patent No.: US 12,634,071 B2
(45) Date of Patent: May 19, 2026

(54) MULTI-CELL PHYSICAL UPLINK SHARED CHANNEL SCHEDULING WITH SOUNDING REFERENCE SIGNAL RESOURCE SETS

(71) Applicant: NOKIA TECHNOLOGIES OY, Espoo (FI)

(72) Inventors: Klaus Hugl, Vienna (AT); Juha Pekka Karjalainen, Sotkamo (FI)

(73) Assignee: Nokia Technologies Oy, Espoo (FI)

( * ) Notice: Subject to any disclaimer, the term of this patent is extended or adjusted under 35 U.S.C. 154(b) by 543 days.

(21) Appl. No.: 18/110,780

(22) Filed: Feb. 16, 2023

(65) Prior Publication Data

US 2024/0283593 A1     Aug. 22, 2024

(51) Int. Cl.
| | |
|---|---|
| *H04L 5/00* | (2006.01) |
| *H04L 1/18* | (2023.01) |
| *H04W 72/12* | (2023.01) |
| *H04W 72/232* | (2023.01) |

(52) U.S. Cl.
CPC ........... *H04L 5/0048* (2013.01); *H04W 72/12* (2013.01); *H04W 72/232* (2023.01)

(58) Field of Classification Search
None
See application file for complete search history.

(56) References Cited

U.S. PATENT DOCUMENTS

| | | | | |
|---|---|---|---|---|
| 2022/0210814 A1* | 6/2022 | Khoshnevisan | ...... | H04L 5/0055 |
| 2022/0322389 A1* | 10/2022 | Khoshnevisan | .... | H04W 72/044 |
| 2023/0007641 A1* | 1/2023 | Kim | .................... | H04W 72/044 |
| 2023/0077060 A1* | 3/2023 | Guo | .................. | H04W 72/1268 |
| 2023/0171783 A1* | 6/2023 | Khoshnevisan | ...... | H04L 5/0048 |
| | | | | 370/329 |

(Continued)

FOREIGN PATENT DOCUMENTS

| | | |
|---|---|---|
| WO | 2022/205406 A1 | 10/2022 |
| WO | 2022/238937 A1 | 11/2022 |
| WO | 2023/282618 A1 | 1/2023 |

OTHER PUBLICATIONS

International Search Report and Written Opinion issued in corresponding PCT International Patent Application No. PCT/EP2024/050074 mailed Apr. 18, 2024.

(Continued)

*Primary Examiner* — Sai Aung
(74) *Attorney, Agent, or Firm* — Lippes Mathias LLP

(57)     ABSTRACT

Multi-cell physical uplink shared channel scheduling with sounding reference signal resource sets is provided. The method may include receiving, from a network entity, a first configuration for multi-cell physical uplink shared channel scheduling for a set of cells and receiving a second configuration that includes at least two uplink sounding reference signal resource sets for at least one serving cell of the set of cells. At least two uplink sounding reference signal resource sets may include information relating to usage of codebook and/or non-codebook based physical uplink shared channel transmission. The method also includes receiving a scheduling message indicating to transmit one or more respective physical uplink shared channels on one or more cells, and determining one SRS resource set for the PUSCH transmission including one or more repetitions for the at least one serving cell of the set of cells.

13 Claims, 8 Drawing Sheets

(56) References Cited

U.S. PATENT DOCUMENTS

2023/0300826 A1*    9/2023    Zhou .................... H04L 5/0051
                                                    370/329
2024/0205919 A1*    6/2024    Xiao ........................ H04L 1/08
2025/0203629 A1*    6/2025    Liu ....................... H04L 5/0044

OTHER PUBLICATIONS

3rd Generation Partnership Project; Technical Specification Group Radio Access Network; NR; Multiplexing and channel coding (Release 17), 3GPP TS 38.212, V17.4.0, Dec. 2022.

3rd Generation Partnership Project; Technical Specification Group Radio Access Network; NR; Physical layer procedures for data (Release 17), 3GPP TS 38.214, V17.4.0, Dec. 2022.

3rd Generation Partnership Project; Technical Specification Group Radio Access Network; NR; Radio Resource Control (RRC) protocol specification (Release 17), 3GPP TS 38.331, V17.3.0, Dec. 2022.

NTT Docomo, Inc., "Revised WID on Multi-carrier enhancements", 3GPP TSG RAN Meeting #95e, RP-220834, Mar. 2022.

* cited by examiner

| SRS resource indicator | Cell #0 | Cell #1 | Cell #2 | Cell #3 |
|---|---|---|---|---|
| 0 | 0 | 0 | 0 | 0 |
| 1 | 0 | 0 | 1 | 1 |
| 2 | 1 | 1 | 0 | 0 |
| 3 | 1 | 1 | 1 | 1 |

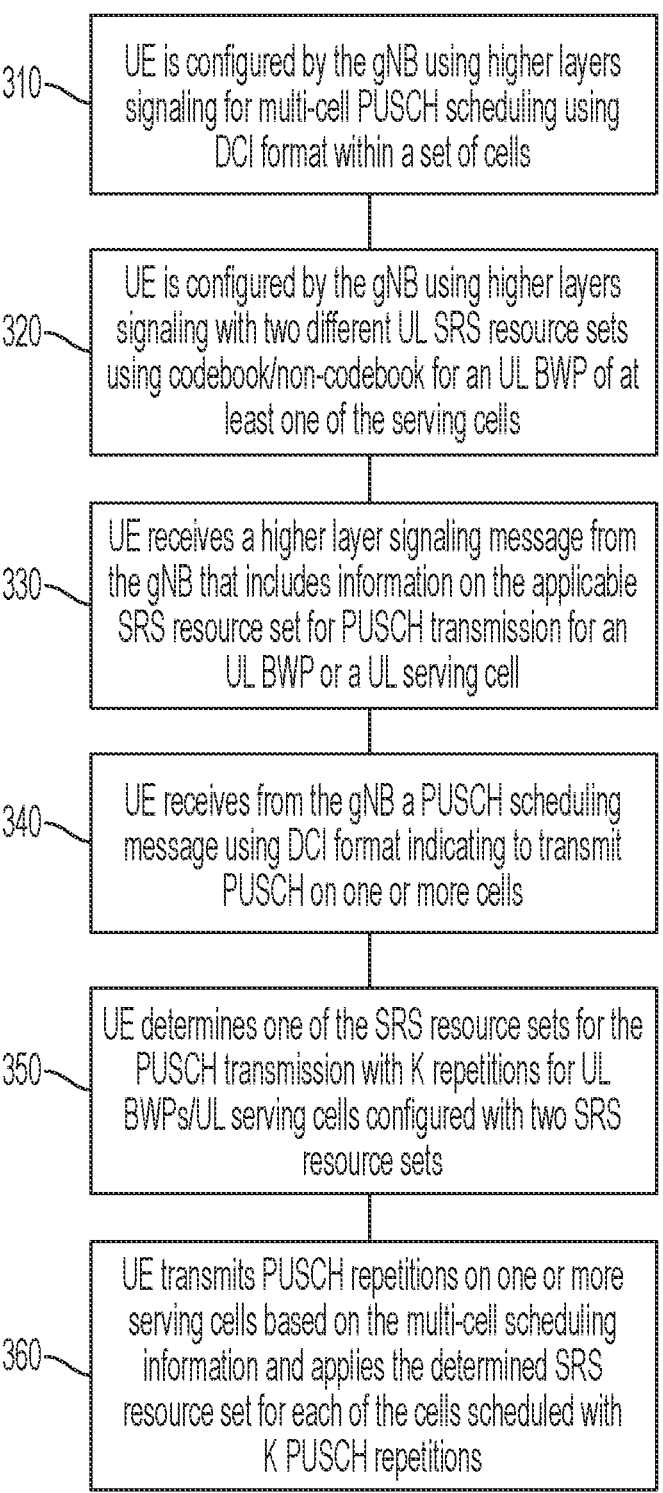

310 — UE is configured by the gNB using higher layers signaling for multi-cell PUSCH scheduling using DCI format within a set of cells 320 — UE is configured by the gNB using higher layers signaling with two different UL SRS resource sets using codebook/non-codebook for an UL BWP of at least one of the serving cells 330 — UE receives a higher layer signaling message from the gNB that includes information on the applicable SRS resource set for PUSCH transmission for an UL BWP or a UL serving cell 340 — UE receives from the gNB a PUSCH scheduling message using DCI format indicating to transmit PUSCH on one or more cells 350 — UE determines one of the SRS resource sets for the PUSCH transmission with K repetitions for UL BWPs/UL serving cells configured with two SRS resource sets 360 — UE transmits PUSCH repetitions on one or more serving cells based on the multi-cell scheduling information and applies the determined SRS resource set for each of the cells scheduled with K PUSCH repetitions

FIG. 3

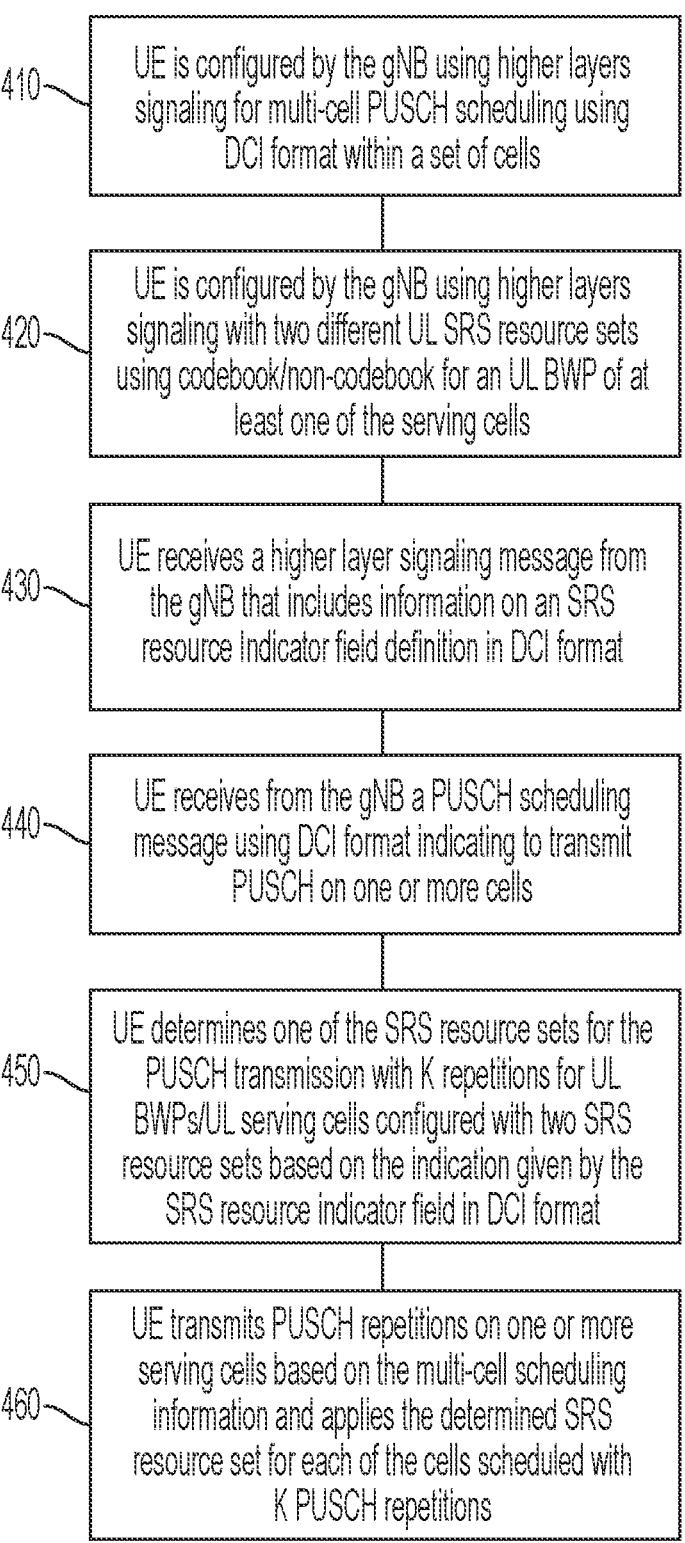

410 — UE is configured by the gNB using higher layers signaling for multi-cell PUSCH scheduling using DCI format within a set of cells 420 — UE is configured by the gNB using higher layers signaling with two different UL SRS resource sets using codebook/non-codebook for an UL BWP of at least one of the serving cells 430 — UE receives a higher layer signaling message from the gNB that includes information on an SRS resource indicator field definition in DCI format 440 — UE receives from the gNB a PUSCH scheduling message using DCI format indicating to transmit PUSCH on one or more cells 450 — UE determines one of the SRS resource sets for the PUSCH transmission with K repetitions for UL BWPs/UL serving cells configured with two SRS resource sets based on the indication given by the SRS resource indicator field in DCI format 460 — UE transmits PUSCH repetitions on one or more serving cells based on the multi-cell scheduling information and applies the determined SRS resource set for each of the cells scheduled with K PUSCH repetitions

FIG. 4

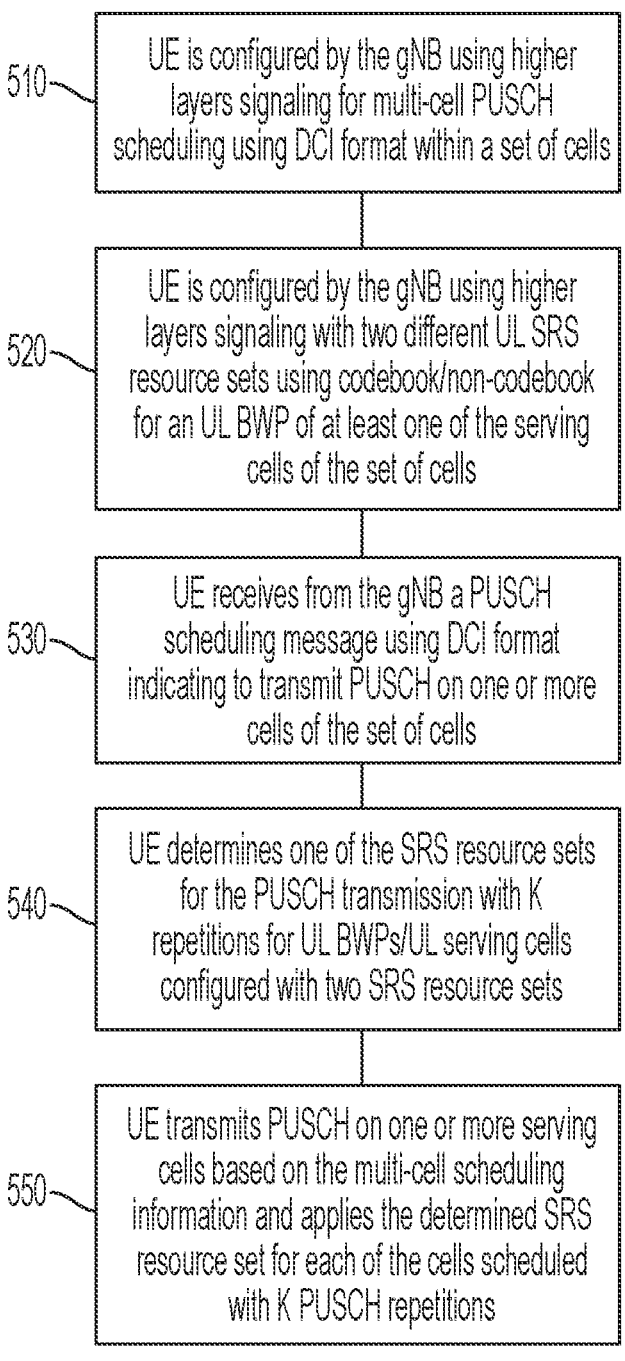

510 — UE is configured by the gNB using higher layers signaling for multi-cell PUSCH scheduling using DCI format within a set of cells 520 — UE is configured by the gNB using higher layers signaling with two different UL SRS resource sets using codebook/non-codebook for an UL BWP of at least one of the serving cells of the set of cells 530 — UE receives from the gNB a PUSCH scheduling message using DCI format indicating to transmit PUSCH on one or more cells of the set of cells 540 — UE determines one of the SRS resource sets for the PUSCH transmission with K repetitions for UL BWPs/UL serving cells configured with two SRS resource sets 550 — UE transmits PUSCH on one or more serving cells based on the multi-cell scheduling information and applies the determined SRS resource set for each of the cells scheduled with K PUSCH repetitions

FIG. 5

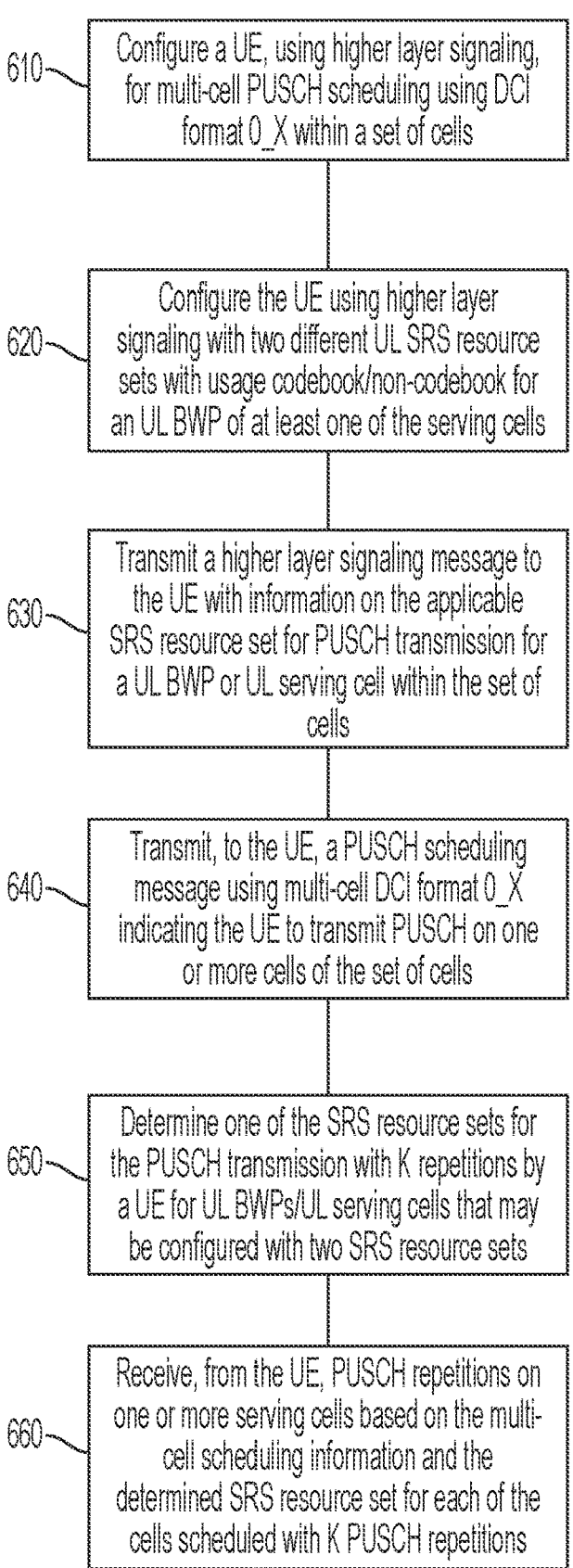

610 — Configure a UE, using higher layer signaling, for multi-cell PUSCH scheduling using DCI format 0_X within a set of cells 620 — Configure the UE using higher layer signaling with two different UL SRS resource sets with usage codebook/non-codebook for an UL BWP of at least one of the serving cells 630 — Transmit a higher layer signaling message to the UE with information on the applicable SRS resource set for PUSCH transmission for a UL BWP or UL serving cell within the set of cells 640 — Transmit, to the UE, a PUSCH scheduling message using multi-cell DCI format 0_X indicating the UE to transmit PUSCH on one or more cells of the set of cells 650 — Determine one of the SRS resource sets for the PUSCH transmission with K repetitions by a UE for UL BWPs/UL serving cells that may be configured with two SRS resource sets 660 — Receive, from the UE, PUSCH repetitions on one or more serving cells based on the multi-cell scheduling information and the determined SRS resource set for each of the cells scheduled with K PUSCH repetitions

FIG. 6

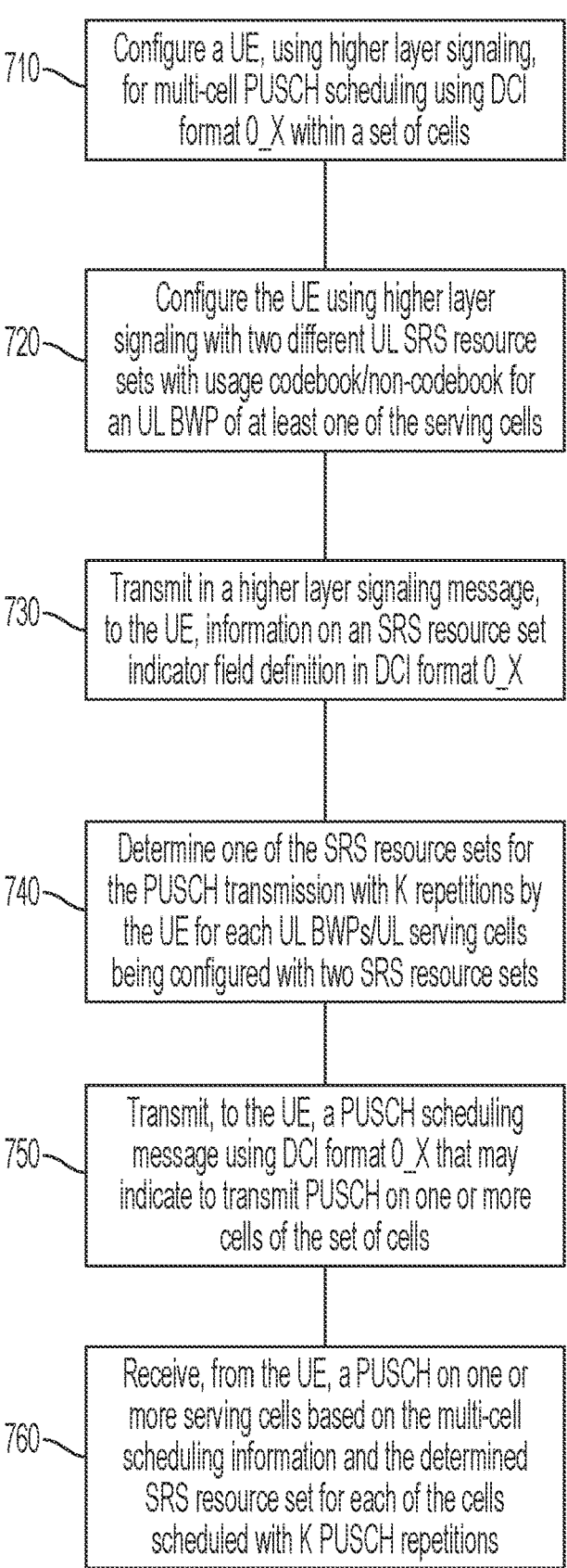

710 — Configure a UE, using higher layer signaling, for multi-cell PUSCH scheduling using DCI format 0_X within a set of cells 720 — Configure the UE using higher layer signaling with two different UL SRS resource sets with usage codebook/non-codebook for an UL BWP of at least one of the serving cells 730 — Transmit in a higher layer signaling message, to the UE, information on an SRS resource set indicator field definition in DCI format 0_X 740 — Determine one of the SRS resource sets for the PUSCH transmission with K repetitions by the UE for each UL BWPs/UL serving cells being configured with two SRS resource sets 750 — Transmit, to the UE, a PUSCH scheduling message using DCI format 0_X that may indicate to transmit PUSCH on one or more cells of the set of cells 760 — Receive, from the UE, a PUSCH on one or more serving cells based on the multi-cell scheduling information and the determined SRS resource set for each of the cells scheduled with K PUSCH repetitions

FIG. 7

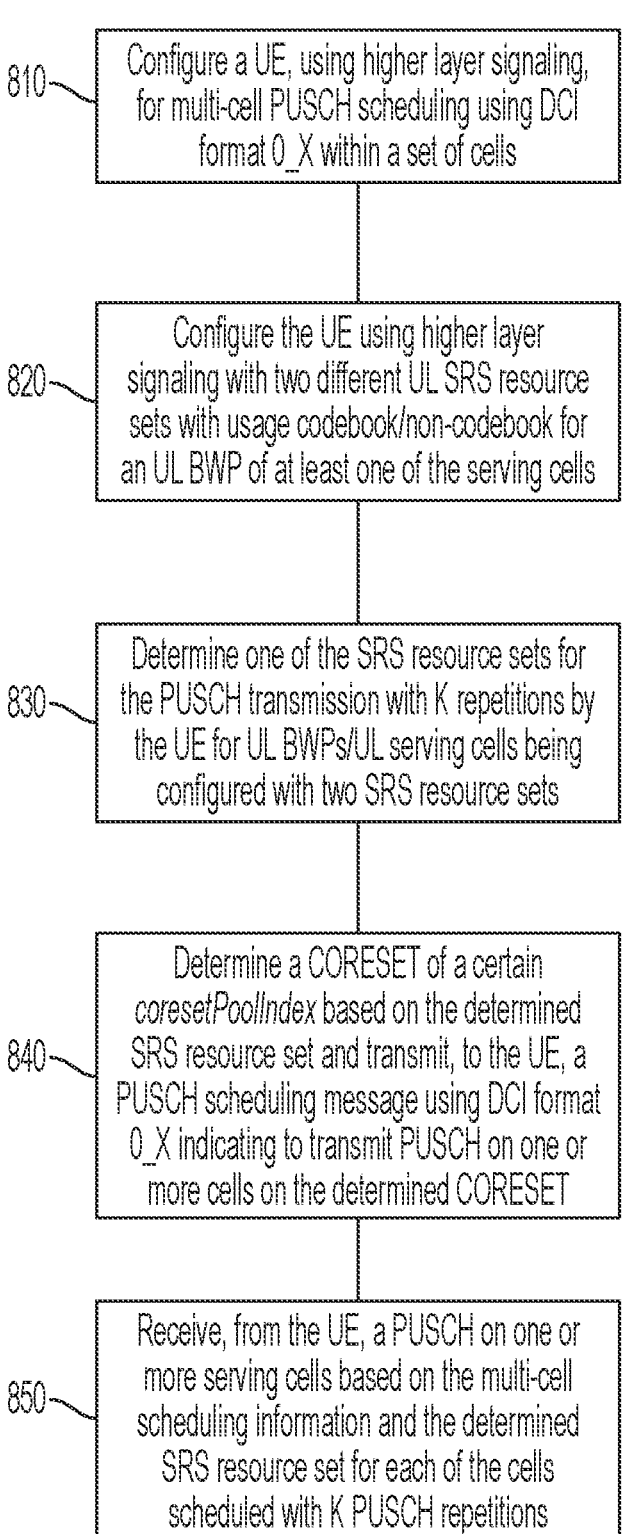

810 — Configure a UE, using higher layer signaling, for multi-cell PUSCH scheduling using DCI format 0_X within a set of cells 820 — Configure the UE using higher layer signaling with two different UL SRS resource sets with usage codebook/non-codebook for an UL BWP of at least one of the serving cells 830 — Determine one of the SRS resource sets for the PUSCH transmission with K repetitions by the UE for UL BWPs/UL serving cells being configured with two SRS resource sets 840 — Determine a CORESET of a certain *coresetPoolIndex* based on the determined SRS resource set and transmit, to the UE, a PUSCH scheduling message using DCI format 0_X indicating to transmit PUSCH on one or more cells on the determined CORESET 850 — Receive, from the UE, a PUSCH on one or more serving cells based on the multi-cell scheduling information and the determined SRS resource set for each of the cells scheduled with K PUSCH repetitions

FIG. 8

MULTI-CELL PHYSICAL UPLINK SHARED CHANNEL SCHEDULING WITH SOUNDING REFERENCE SIGNAL RESOURCE SETS

TECHNICAL FIELD

Some example embodiments may generally relate to mobile or wireless telecommunication systems, such as Long Term Evolution (LTE) or fifth generation (5G) new radio (NR) access technology, or beyond-5G, or other communications systems. For example, certain example embodiments may relate to multi-cell physical uplink shared channel scheduling with sounding reference signal resource sets.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or 5G-advanced radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Various exemplary embodiments may provide an apparatus including at least one processor and at least one memory storing instructions. The stored instructions when executed by the at least one processor, cause the apparatus at least to receive, from a network entity, a first configuration for multi-cell physical uplink shared channel scheduling for a set of cells, and receive, from the network entity, a second configuration including at least two uplink sounding reference signal resource sets for at least one serving cell of the set of cells. At least two uplink sounding reference signal resource sets include information relating to usage for codebook and/or non-codebook based physical uplink shared channel transmission. The apparatus may be further caused to receive, from the network entity, a physical uplink shared channel scheduling message indicating for the apparatus to transmit one or more respective physical uplink shared channels on one or more cells of the set of cells, and determine one sounding reference signal resource set of the at least two uplink sounding reference signal resource sets for the physical uplink shared channel transmission including one or more repetitions for the at least one serving cell of the set of cells.

Certain exemplary embodiments may provide an apparatus including at least one processor and at least one memory storing instructions. The stored instructions when executed by the at least one processor, cause the apparatus at least to transmit, to a user device, a first configuration for multi-cell physical uplink shared channel scheduling for a set of cells, and transmit, to the user device, a second configuration including at least two uplink sounding reference signal resource sets for at least one serving cell of the set of cells. At least two uplink sounding reference signal resource sets include information relating to usage for codebook and/or non-codebook based physical uplink shared channel transmission. The apparatus may be further caused to determine one sounding reference signal resource set of the at least two uplink sounding reference signal resource sets for the physical uplink shared channel transmission including one or more repetitions for the at least one serving cell of the set of cells, and transmit, to the user device, a physical uplink shared channel scheduling message indicating for the user device to transmit one or more respective physical uplink shared channels on one or more cells of the set of cells.

BRIEF DESCRIPTION OF THE DRAWINGS

For proper understanding of example embodiments, reference should be made to the accompanying drawings, as follows:

FIG. 3 illustrates an example of a flow diagram of procedures performed by a UE, according to various exemplary embodiments;

FIG. 4 illustrates an example of another flow diagram of procedures performed by a UE, according to certain exemplary embodiments;

FIG. 5 illustrates an example of a further flow diagram of procedures performed by a UE, according to some exemplary embodiments;

FIG. 6 illustrates an example of a flow diagram of procedures performed by a network entity, according to various exemplary embodiments;

FIG. 7 illustrates an example of another flow diagram of procedures performed by a network entity, according to certain exemplary embodiments;

FIG. 8 illustrates an example of a further flow diagram of procedures performed by a network entity, according to some exemplary embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and non-transitory computer program products for multi-cell physical uplink shared channel (PUSCH) scheduling. For instance, certain exemplary embodiments may be directed to optimizing multi-cell PUSCH scheduling with multiple applicable sounding reference signal (SRS) resource sets.

5G/NR technology supports a various use cases and deployment scenarios, which may use cyclic prefix orthogonal frequency division multiplexing (CP-OFDM) in downlink (DL) transmissions from a base station, network node, or other network entity, such as a next generation node B (gNB), to a user equipment (UE). In uplink (UL) transmissions from, for example, the UE to the gNB, both CP-OFDM and discrete Fourier transform spread orthogonal frequency division multiplexing (DFT-S-OFDM) may be used. In the time domain, DL and UL physical resources may be organized into subframes, which may be divided into multiple slots.

A reliability of UL transmissions in multi-transmission-reception point (M-TRP) scenarios may be enhanced by, for example, providing a single DL control information indicator (S-DCI) for time-division multiplexing (TDM) M-TRP with two TRPs. A UE may be configured with two different UL SRS resource sets with two different DL or joint DL and UL/UL transmission configuration indicator (TCI) states associated as a spatial source. A network may be aware of an antenna panel specific transmission capability of UL SRS codebook-based transmission into a certain spatial UL direction. The antenna panel may include information on the number of UL SRS antenna ports of the UE. Based on antenna panel specific transmission capability information, the network may perform or trigger transmission of two different UL SRS resource sets using codebook to obtain a TRP-specific transmission precoder matrix indicator (TPMI). The TPMI may indicate, or allow the network to determine, precoder index and rank selection. The TPMI may provide the ability to configure an antenna panel specifically for PUSCH transmissions.

Figures 1, 2:
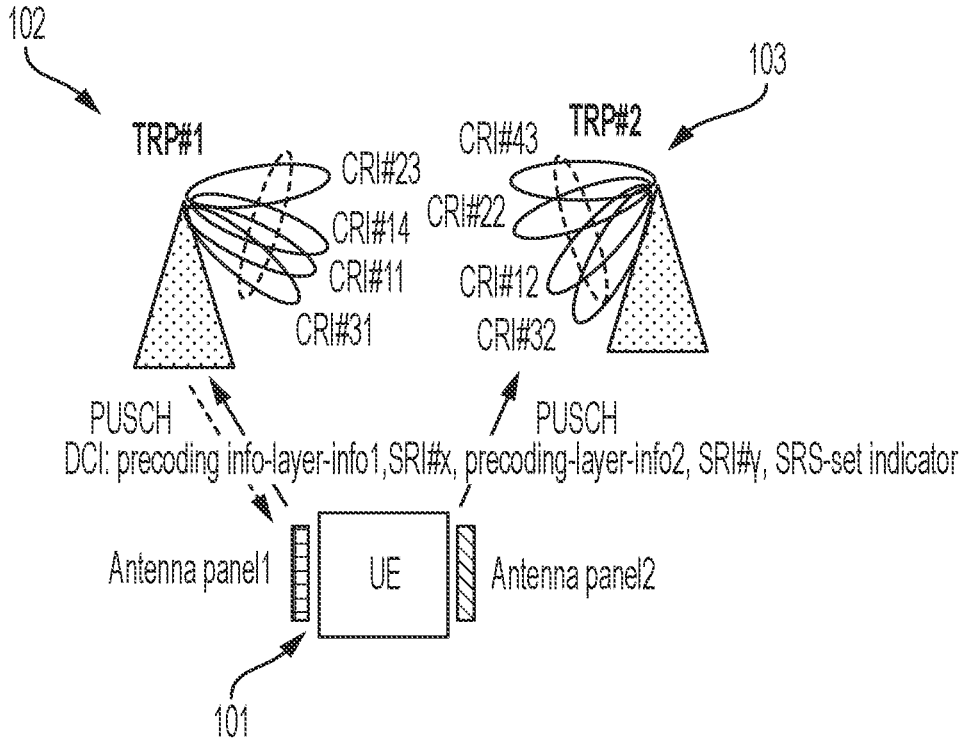
FIG. 1 illustrates an exemplary system diagram of a configuration of a user equipment (UE) communicating with transmission reception points.
FIG. 2 illustrates an example of a table for a sounding reference signal (SRS) resource set indicator of 4 rows and 4 cells.

Based on obtained TRP-specific TPMI and SRS resource indicator (SRI) information, the network may trigger non-simultaneous TRP-specific PUSCH transmissions by indicating, via downlink control information (DCI), a codepoint for a single SRS resource set indicator. FIG. 1 illustrates an example of a configuration of a UE 101 with antenna panel #1 and antenna panel #2, which communicate with a TRP #1 102 and a TRP #2 103 for TDM M-TRP PUSCH repetition and antenna panel selection. In the codepoint, 2-bits (e.g., 4 values) may be reserved for when two SRS resource sets are configured with usage codebook or non-codebook, and 0-bit may be reserved otherwise. The first two values out of the four values of the DCI codepoint may be used to indicate which of the two SRS resource sets may be used to enable dynamic switching between a single TRP (either TRP #1 or TRP #2) PUSCH transmission with K (nominal) repetitions in TDM. The other remaining two values may be used to enable M-TRP PUSCH transmission repetition hopping between TRP #1 and TRP #2 in TDM manner with a repetition of either cyclical or sequential mapping to TRP #1 and TRP #2 depending on the configured PUSCH configuration.

For codebook-based transmission, the DCI may include two separate codepoint fields for SRIs and two precoding information and number of transmission layers fields. For example, the first field may indicate the number of transmission layers and the second field may not indicate the number of transmission layers. For transmissions that are based on non-codebook transmissions, the DCI may include two SRI codepoint fields. The first SRI codepoint field may indicate the transmission layer(s) and the second SRI codepoint field may not indicate any transmission layer(s). Based on the received S-DCI, the UE may then transmit the PUSCH transmission using the multiple antenna panels to two TRPs, which may be transmitted one panel at a time.

Multi-cell PUSCH and physical downlink shared channel (PDSCH) scheduling may, for example, be implemented to provide flexibility and spectral/power efficiency on scheduling data over multiple cells including intra-band cells and inter-band cells. To reduce a control overhead, there may be a need in NR technology to extend single cell scheduling to multi-cell PUSCH/PDSCH scheduling with a single scheduling DCI, while providing a balance between overhead savings and scheduling restriction. As an example of a procedure to address this need, for a set of cells defined by higher layer signaling of up to four cells of a cell group, a multi-cell DCI format 0_X may schedule PUSCH(s) on one or more cells of the set of cells. As part of implementing this example of M-TRP PUSCH, certain DCI fields in DCI format 0_1 and 0_2 may be used, such as, for example, an SRS resource set indicator for 2 bits, which may define if the first SRS resource set, the second SRS resource set, or both SRS resource sets that may be applied for a PUSCH repetition bundle. Another example of a DCI field may be a second SRS resource indicator, which may provide an SRI for the second SRS resource set when the SRS resource set indicator indicates to the UE that both SRS resource sets may be applicable for a PUSCH repetition bundle. A further example of a DCI field may be second precoding information, which may provide a TPMI for the second SRS resource set for codebook-based PUSCH when the SRS resource set indicator indicates to the UE that both SRS resource sets may be applicable for a PUSCH repetition bundle.

Another example of M-TRP PUSCH implementation may excluded the second SRS resource indicator and the second precoding information DCI fields from the multi-cell DCI format 0_X. Thus, the above-example of the M-TRP PUSCH implementation may not enable using both SRS resource sets applicable for a single PUSCH repetition bundle because of the exclusion of these two DCI fields.

Various exemplary embodiments may provide several technical improvements, enhancements, and/or advantages to address, for example, the capability for a UE to be able to perform a procedure related to interpreting a value of an indicated SRS resource when two UL SRS resource sets are configured without the second SRS resource indicator and/or the second precoding information being available in DCI format 0_X. Various exemplary embodiments may provide advantageous procedures that may allow for cells which are schedulable by a multi-cell DCI scheduling PUSCH on more than one serving cell and operate with two SRS resource sets for PUSCH repetition and single-cell DCI legacy scheduling.

According to various exemplary embodiments, first and second SRS resource sets may be defined to respectively have lower and higher srs-ResourceSetIds of the two SRS resources sets configured by higher layer parameter srs-ResourceSetToAddModList or srs-ResourceSetToAddModListDCI-0-2, and associated with the higher layer parameter usage of value 'nonCodeBook' if txConfig=nonCodebook is satisfied or 'codebook' if txConfig=codebook is satisfied. For example, when one SRS resource set may be configured by higher layer parameter srs-ResourceSetToAddModList or srs-ResourceSetToAddModListDCI-0-2, and the one SRS resource set may be associated with the higher layer parameter usage of value 'codebook' or 'nonCodeBook' respectively, the first SRS resource set may be set to be the SRS resource set.

According to certain exemplary embodiments, a direct association may be established for one of the SRS resource sets configured with codebook or non-codebook to be used for PUSCH scheduled by the multi-cell DCI format 0_X. For example, the UE may use or set for PUSCH transmissions to operate with a single SRS resource set for DCI format 0_X scheduling, in which the second SRS resource indicator and the second precoding information DCI fields are not required. As another example, the UE may use or set for scheduling with DCI format 0_1/0_2, the full flexibility of either selecting one SRS resource set or applying both SRS resource sets for a PUSCH transmission repetition bundle.

In an example implementation, the determination of the SRS resource set from the two SRS resource sets for PUSCH scheduled by the multi-cell DCI format 0_X may be fixed or provided by 3rd generation partnership project (3GPP) specifications. Either the first SRS resource set with lower a srs-ResourceSetId or the second SRS resourced set with a higher srs-ResourceSetId may be hard-coded or set in 3GPP specification.

In another example implementation according to certain exemplary embodiments, the association may be signalled or otherwise configured by one or more higher layers to be either per set of cells for multi-cell DCI scheduling or per dedicated UL bandwidth part (BWP), such as, for example, in the SRS-config. The higher layer signaling may define whether the first SRS resource set or the second SRS resource set is applied for the PUSCH transmission to be applicable for all the UL serving cells/UL BWPs of the set of cells or for each of the UL BWPs separately.

According to various exemplary embodiments, the multi-cell DCI format 0_X may contain a DCI field, SRS resource set indicator, that may be included in DCI format 0_X. In an example implementation, a single 1-bit SRS resource set indicator DCI field may be included in DCI format 1_X, which indicates the applicable SRS resource set for all the scheduled UL serving cells. The DCI field may indicate whether the first SRS resource set or the second SRS resource set may be applied for the PUSCH repetition operation, in which value "0" may indicate the first SRS resource set and value "1" may indicate the second SRS resource set.

In an example in which the DCI field may be a value of "1", the SRS resource indicator field and precoding information and number of layers field may be associated with the second SRS resource set. The SRS resource set indicator DCI field may be 1-bit when one or more conditions have been satisfied, such as if txConfig=nonCodeBook and there are two SRS resource sets configured by srs-ResourceSet-ToAddModList and associated with the usage of value nonCodeBook, or txConfig=codebook and there are two SRS resource sets configured by srs-ResourceSetToAdd-ModList and associated with usage of value codebook.

In another example in which the DCI field may be the value "0", the SRS resource indicator field and precoding information and number of layers field may be associated with the first SRS resource set. The SRS resource set indicator DCI field may be 0-bit if the one or more conditions for the SRS resource set indicator DCI field of 1-bit has not been satisfied.

According to some exemplary embodiments, the first and the second SRS resource sets may be respectively the resource sets with lower and higher srs-ResourceSetIds of the two SRS resources sets configured by higher layer parameter srs-ResourceSetToAddModList or srs-Resource-SetToAddModListDCI-0-2, and associated with the higher layer parameter usage of value nonCodeBook if txConfig=nonCodebook or value codebook if txConfig=codebook. When one SRS resource set may be configured by higher layer parameter srs-ResourceSetToAd-dModList or srs-ResourceSetToAddModListDCI-0-2, and associated with the higher layer parameter usage of value codebook or nonCode Book respectively, the first SRS resource set may be set as the SRS resource set.

When two SRS resource sets may be configured in srs-ResourceSetToAddModList or srs-ResourceSetToAdd- ModListDCI-0-2 with higher layer parameter usage in SRS-ResourceSet set to codebook or noncodebook, for PUSCH repetition Type A, the same symbol allocation may be applied across K consecutive slots and the PUSCH may be limited to a single transmission layer when K>1. The UE may repeat a transport block (TB) across the K≥1 consecutive slots applying the same symbol allocation in each slot. The association of the first SRS resource set and second SRS resource set in srs-ResourceSetToAddModList or srs-Re-sourceSetToAddModListDCI-0-2 to each slot may be determined based on the DCI format. As an example, the association of the resource sets may be determined by when a DCI format 0_1 or DCI format 0_2 indicates codepoint "00" for the SRS resource set indicator or a DCI format 0_X indicates codepoint "0" for the SRS resource set indicator, the first SRS resource set may be associated with all K consecutive slots.

As a further example, the association of the resource sets may be determined by if a DCI format 0_1 or DCI format 0_2 indicates codepoint "01" for the SRS resource set indicator or a DCI format 0_X indicates codepoint "1" for the SRS resource set indicator, the second SRS resource set may be associated with all K consecutive slots. As another example, if a DCI format 0_1 or DCI format 0_2 indicates codepoint "10" for the SRS resource set indicator, the first SRS resource set and the second SRS resource set association to K consecutive slots may be determined based on a value of K consecutive slots and/or the mapping of the PUSCH-Config. For example, when K=2, the first and second SRS resource sets may be applied to the first slot and the second slot of two consecutive slots, respectively. For example, when K>2 and cyclicMapping in PUSCH-Config is enabled, the first and second SRS resource sets may be applied to the first slot and the second slot of K consecutive slots, respectively, and the same SRS resource set mapping pattern may continue for the remaining slots of K consecutive slots. For example, when K>2 and sequentialMapping in PUSCH-Config is enabled, the first SRS resource set may be applied to the first slot and the second slot of K consecutive slots. The second SRS resource set may be applied to the third slot and the fourth slot of K consecutive slots, and the same SRS resource set mapping pattern may continue for the remaining slots of K consecutive slots.

As another example, a DCI format 0_1 or DCI format 0_2 may indicate codepoint "11" for the SRS resource set indicator, and the first SRS resource set and the second SRS resource set association to K consecutive slots may be determined based on a value of K consecutive slots and/or the mapping of the PUSCH-Config. For example, when K=2, the second SRS resource set and the first SRS resource set may be applied to the first slot and the second slot of two consecutive slots, respectively. For example, when K>2 and cyclicMapping in PUSCH-Config is enabled, the second SRS resource set and the first SRS resource set may be applied to the first slot and the second slot of K consecutive slots, respectively. The same SRS resource set mapping pattern may continue for the remaining slots of the K consecutive slots. For example, when K>2 and sequential-Mapping in PUSCH-Config is enabled, the second SRS resource set may be applied to the first slot and the second slot of K consecutive slots, and the first SRS resource set may be applied to the third slot and the fourth slot of K consecutive slots. The same SRS resource set mapping pattern may continue for the remaining slots of the K consecutive slots. In contrast to the operation with DCI format 0_1/0_2, these above-described examples may allow to select one of the SRS resource sets for all the PUSCH repetitions.

According to various exemplary embodiments, another implementation may provide for each of the UL serving cells within the set of cells or each of the scheduled UL serving cells a 1-bit SRS resource set indicator DCI field that may be included in DCI format 0_X. The DCI field definition for each of the cells may be the same as in the above implementation. The operation in the selection of the applicable SRS resource set from the two SRS resource sets may be the same based on the cell specific indication.

According to some exemplary embodiments, a further implementation may provide a higher layer configuration between the first implementation, such as a single 1-bit SRS resource set indicator DCI field applicable to all the scheduled cells, and the second implementation, such as a separate 1-bit SRS resource set indicator fields for each of the UL serving cells within the set of cells or each of the scheduled cells.

According to certain exemplary embodiments, another implementation may provide a 1-3 bit SRS resource set indicator DCI field that may be included in DCI format 0_X to jointly indicate the applicable SRS resource set for all the scheduled UL serving cells. FIG. 2 illustrates an example of a table for the SRS resource set indicator of 4 rows and 4 cells. The UE may be configured by higher layers, such as a radio resource control (RRC) layer, with a table, for example, similar to the table shown in FIG. 2. The size in number of bits of the DCI field for the SRS resource set indicator may be provided by the number of rows of the configured table, such as, for example, as $\lceil \log 2(\text{num\_table\_rows}) \rceil$. The example table of FIG. 2, an example result may be in bit width of $\lceil \log 2(4) \rceil = 2$ bits. The indicated value of the SRS resource set indicator in DCI format 0_X may indicate a row in the higher layer configured table, which may provide the SRS resource set selection information for each of the cells within the set of cells. For example, a value of "0" for the first SRS resource set and a value of "1" for the second SRS resource set for each of the cells within the set of cells.

Various exemplary embodiments may provide an implicit association of one of the SRS resource sets configured with codebook or non-codebook to be used for PUSCH scheduled by the multi-cell DCI format 0_X. The determination of an SRS resource set from the two SRS resource sets may be implicitly indicated by coresetPoolIndex associated with a control resource set (CORESET) that the scheduling DCI 0_X may be received on. For example, the first SRS resource set with lower srs-ResourceSetId may be associated with some coresetPoolIndex (e.g., 0) configured by the network and the second SRS resourced set with higher srs-Resource-SetId may be associated with another coresetPoolIndex (e.g., 1).

FIG. 3 illustrates an example flow diagram of a method, according to various exemplary embodiments. In the exemplary embodiments, the method of FIG. 3 may be performed by a network-connected device, or a group of multiple network-connected devices in a 3GPP system, such as LTE or 5G-NR. For instance, in the exemplary embodiments, the method of FIG. 3 may be performed by a UE similar to apparatus 910 illustrated in FIG. 9.

According to various exemplary embodiments, the method of FIG. 3 may include, at 310, the UE may be configured by a network entity, such as a base station (e.g., gNB), using higher layer signalling, for example, RRC, for multi-cell PUSCH scheduling using DCI format 0_X within a set of cells. At 320, the UE may be configured by the gNB using higher layer signalling (e.g., RRC) with two different UL SRS resource sets (e.g., SRS resource set #1 and SRS resource set #2) with usage codebook/non-codebook for an UL BWP of at least one of the serving cells of the set of cells. The higher layer configuration of 310 and 320 may be received in a single or separate higher layer configuration messages. According to a UL SRS resource set configuration, the UE may transmit periodically, or semi-persistently or aperiodically, configured SRS resources associated with both resource sets to enable the gNB to select one SRI and one TPMI including precoder matrix index and rank to be indicated via DCI 0_X or to select SRI to be indicated via DCI 0_X. For example, the DCI 0_X may be a multi-cell DCI for codebook based dynamic grant PUSCH transmission and the SRI may include layer(s) and SRS resource indice(s). Further, the DCI 0_X may be a multi-cell DCI for non-codebook based dynamic grant PUSCH transmission for non-codebook based PUSCH transmission.

At 330, the UE may receive a higher layer signaling message, such as RRC, from the gNB with information on the applicable SRS resource set for PUSCH transmission for a UL BWP or UL serving cell within the set of cells. For example, indicating whether the first SRS resource set or the second SRS resource set may be used for PUSCH transmission for an uplink serving cell. The higher layer configuration received at 330 may be received in a separate higher layer signaling message. Alternatively, this procedure of 330 may be combined with 310 and/or 320 when the information may be received in a single higher layer configuration message together with the information of 310 and/or 320.

At 340, for example, the UE may receive, from the gNB, a PUSCH scheduling message using multi-cell DCI format 0_X indicating to transmit PUSCH on one or more cells of the set of cells. At 350, the UE may determine one of the SRS resource sets for the PUSCH transmission with K repetitions (for K>1 or K≥1) for UL BWPs/UL serving cells that may be configured with two SRS resource sets in 320. In another example, the UE may determine the first SRS resource set, which may be the SRS resource set with the lower SRS resource set ID, for PUSCH repetition transmissions on the UL BWP of the serving cell. In a further example, the UE may determine the second SRS resource set, which may be the SRS resource set with the higher SRS resource set ID, for PUSCH repetition transmissions on the UL BWP of the serving cell. In another example, if higher layer signaling on the applicable SRS resource set has been received at 330, the UE may determine a single applicable SRS resource set from the higher layer signaling information for PUSCH repetition transmissions on the UL BWP of the serving cell.

At 360, the UE may transmit PUSCH repetitions on one or more serving cells based on the multi-cell scheduling information received at 340 and apply the determined SRS resource set for each of the cells scheduled with K PUSCH repetitions (for K>1 or K≥1) based on the selected exemplary determination in 350.

FIG. 4 illustrates an example flow diagram of another method, according to some exemplary embodiments. In the exemplary embodiments, the method of FIG. 4 may be performed by a network-connected device, or a group of multiple network-connected devices in a 3GPP system, such as LTE or 5G-NR. For instance, in the exemplary embodiments, the method of FIG. 4 may be performed by a UE similar to apparatus 910 illustrated in FIG. 9.

According to some exemplary embodiments, the method of FIG. 4 may include, at 410, which is similar to 310, the UE may be configured by a network entity, such as a base station (e.g., gNB), using higher layer signalling, for example, RRC, for multi-cell PUSCH scheduling using DCI format 0_X within a set of cells. At 420, which is similar to 320, the UE may be configured by the gNB using higher layer signalling (e.g., RRC) with two different UL SRS resource sets (e.g., SRS resource set #1 and SRS resource set #2) with usage codebook/non-codebook for an UL BWP of at least one of the serving cells of the set of cells. The higher layer configuration of 410 and 420 may be received in a single or separate higher layer configuration messages. According to a UL SRS resource set configuration, the UE may transmit periodically, or semi-persistently or aperiodically, configured SRS resources associated with both resource sets to enable the gNB to select one SRI and one TPMI including precoder matrix index and rank to be indicated via DCI 0_X or to select SRI to be indicated via DCI 0_X. For example, the DCI 0_X may be a multi-cell DCI for codebook based dynamic grant PUSCH transmission and the SRI may include layer(s) and SRS resource indice(s). Further, the DCI 0_X may be a multi-cell DCI for non-codebook based dynamic grant PUSCH transmission for non-codebook based PUSCH transmission.

At 430, the UE may receive in a higher layer signaling message, such as RRC, from the gNB, information on an SRS resource set indicator field definition in DCI format 0_X. As a first example, the higher layer signaling may indicate that either a single 1-bit SRS resource set indicator field with value '0' or '1' may be present in DCI format 0_X applicable to all scheduled UL BWPs/serving cells, or if DCI format 0_X may contain separate 1-bit SRS resource set indicator fields for each of the cells within the set of cells or for each UL serving cells scheduled by a DCI format 0_X. As a second example, the higher layer signaling may indicate an SRS resource set indicator table for a joint applicable SRS resource set indication for DCI format 0_X, such that the number of rows may define a DCI size for the SRS resource set indicator field in DCI format 0_X as ⌈log 2(num_table_rows)⌉ bits and the table may contain a row for each of the UL serving cells within the set of cells or at least for UL serving cells configured with two SRS resources sets in 420. The higher layer configuration of 430 may be received in a separate higher layer signaling message, or may be combined and received in a single higher layer configuration message together with the information of 410 and/or 420.

At 440, the UE may receive, from the gNB, a PUSCH scheduling message using DCI format 0_X that may indicate to transmit PUSCH on one or more cells of the set of cells. For a first non-limiting example, the DCI format may include a single 1-bit SRS resource indicator field with value '0' or '1' to be present in DCI format applicable to all schedule UL BWPs/serving cells. For a second non-limiting example, the DCI format may include a 1-bit SRS resource indicator field with value '0' or '1' for each of the cells within the set of cells or for each UL serving cells scheduled by a DCI format 0_X. For a third non-limiting example, if in 430 the higher layer signaling is received based on the first example, the DCI format either includes a single 1-bit SRS resource set indicator field with value '0' or '1' to be present in DCI format applicable to all schedule UL BWPs/ serving cells or a 1-bit SRS resource set indicator field with value '0' or '1' for each of the cells within the set of cells or for each UL serving cells scheduled by a DCI format 0_X. For a fourth non-limiting example, if in 430 the higher layer signaling is received based on the second example, the DCI format may include an SRS resource set indicator field of size of ⌈log 2(num_table_rows) ⌉ bits providing a joint indication for the applicable SRS resource set for each of the cells within the set of cells.

At 450, the UE may determine one of the SRS resource sets for the PUSCH transmission with K repetitions (for K>1 or K≥1) for UL BWPs/UL serving cells being configured with two SRS resource sets, at 420, based on the indication given by the SRS resource set indicator field(s) in DCI format 0_X. If the first example of 440 and/or the third example of 440 is applied in which a single SRS resource set indicator DCI field may be configured, the UE may determine, based on the single 1-bit SRS resource set indicator field, that the first SRS resource set, such as the SRS resource set with the lower SRS resource set ID, is applied for PUSCH transmission with repetitions on the UL BWP of all the scheduled serving cell if the SRS resource set indicator in DCI format 0_X indicates '0.' The UE may determine the second SRS resource set if the SRS resource set indicator in DCI format 0_X indicates '1' for all the scheduled UL serving cells. If the second example of 440 and/or the third example of 440 is applied in which cell-specific SRS resource set indicator fields are configured, the UE may determine, based on the cell-specific SRS resource set indicator field(s), that the first SRS resource set, such as the SRS resource set with the lower SRS resource set ID, is applied for PUSCH transmission with repetitions on the UL BWP of a scheduled serving cell if the SRS resource set indicator in DCI format 0_X for that cell indicates '0' and the second SRS resource set if the SRS resource set indicator in DCI format 0_X indicates '1' for that scheduled cell.

Further, if the fourth example of 430 is applied, the UE may determine the applicable SRS resource set for each of the scheduled cells separately based on the joint indication and the indication of the SRS resource set field in DCI format 0_X. As an example, the UE may determine the applicable row in the configured applicable SRS resource set table based on the value of the SRS resource set indicator field. For this determined applicable row, the UE may determine for each of the scheduled cells the applicable values in the applicable SRS resource set table row as either '0' or '1'. For each of the scheduled cells, the UE may determine that either the first SRS resource set, such as the SRS resource set with the lower SRS resource set ID, for PUSCH transmission with repetitions on the UL BWP of the serving cell if value '0' was determined for the scheduled cells and the second SRS resource set if the value '1' was determined for the scheduled cell.

At 460, the UE may transmit a PUSCH on one or more serving cells based on the multi-cell scheduling information received at 440 and apply the determined SRS resource set for each of the cells scheduled with K PUSCH repetitions (for K>1 or K≥1) based on 450.

FIG. 5 illustrates an example flow diagram of a further method, according to certain exemplary embodiments. In the exemplary embodiments, the method of FIG. 5 may be performed by a network-connected device, or a group of multiple network-connected devices in a 3GPP system, such as LTE or 5G-NR. For instance, in the exemplary embodiments, the method of FIG. 5 may be performed by a UE similar to apparatus 910 illustrated in FIG. 9.

According to certain exemplary embodiments, the method of FIG. 5 may include, at 510, which is similar to 310 and/or 410, the UE being configured by a network entity, such as a base station (e.g., gNB), using higher layer signalling, for example, RRC, for multi-cell PUSCH scheduling using DCI format 0_X within a set of cells. At 520, which is similar to 320 and/or 420, the UE may be configured by the gNB using higher layer signalling (e.g., RRC) with two different UL SRS resource sets (e.g., SRS resource set #1 and SRS resource set #2) with usage codebook/non-codebook for an UL BWP of at least one of the serving cells of the set of cells. The higher layer configuration of 510 and 520 may be received in a single or separate higher layer configuration messages. According to a UL SRS resource set configuration, the UE may transmit periodically, or semi-persistently or aperiodically, configured SRS resources associated with both resource sets to enable the gNB to select one SRI and one TPMI including precoder matrix index and rank to be indicated via DCI 0_X or to select SRI to be indicated via DCI 0_X. For example, the DCI 0_X may be a multi-cell DCI for codebook based dynamic grant PUSCH transmission and the SRI may include layer(s) and SRS resource indice(s). Further, the DCI 0_X may be a multi-cell DCI for non-codebook based dynamic grant PUSCH transmission for non-codebook based PUSCH transmission.

At 530, the UE may receive, from the gNB, a PUSCH scheduling message using DCI format 0_X indicating to transmit PUSCH on one or more cells of the set of cells, similar to 340. At 540, the UE may determine one of the SRS resource sets for the PUSCH transmission with K repetitions (for K>1 or K≥1) for UL BWPs/UL serving cells being configured with two SRS resource sets. If the scheduling DCI format 0_X is received on a CORESET of coreset-PoolIndex '0', the UE may determine the first or the second SRS resource set to be applied for PUSCH transmission with repetition on the UL BWP of all the scheduled serving cell. If the scheduling DCI format 0_X is received on a CORE-SET of coresetPoolIndex '1', the UE may determine the second or the first SRS resource set to be applied for PUSCH transmission with repetitions on the UL BWP of all the scheduled serving cell.

At 550, the UE may transmit a PUSCH on one or more serving cells based on the multi-cell scheduling information received in 530 and apply the determined SRS resource set for each of the cells scheduled with K PUSCH repetitions (for K>1 or K≥1) based on 540.

FIG. 6 illustrates an example flow diagram of a method, according to various exemplary embodiments. In the exemplary embodiments, the method of FIG. 6 may be performed by a network entity, or a basestation such as an LTE NB or 5G-NR gNB. For instance, in the exemplary embodiments, the method of FIG. 6 may be performed by a gNB similar to apparatus 920 illustrated in FIG. 9.

According to various exemplary embodiments, the method of FIG. 6 may include, at 610, the network entity, such as a base station (e.g., gNB) may configure the UE, using higher layer signalling, for example, RRC, for multi-cell PUSCH scheduling using DCI format 0_X within a set of cells. At 620, the network entity, such as a base station (e.g., gNB) may configure the UE using higher layer signalling (e.g., RRC) with two different UL SRS resource sets (e.g., SRS resource set #1 and SRS resource set #2) with usage codebook/non-codebook for an UL BWP of at least one of the serving cells of the set of cells. The higher layer configuration of 610 and 620 may be transmitted in a single or separate higher layer configuration messages. According to a UL SRS resource set configuration, the UE may transmit periodically, or semi-persistently or aperiodically, configured SRS resources associated with both resource sets. Based on these UL SRS transmissions by the UE the gNB may select one SRI and one TPMI including precoder matrix index and rank to be indicated via DCI 0_X or to select SRI to be indicated via DCI 0_X. For example, the DCI 0_X may be a multi-cell DCI for codebook based dynamic grant PUSCH transmission and the SRI may include layer(s) and SRS resource indice(s). Further, the DCI 0_X may be a multi-cell DCI for non-codebook based dynamic grant PUSCH transmission for non-codebook based PUSCH transmission.

At 630, the gNB may transmit a higher layer signaling message, such as RRC, to the UE with information on the applicable SRS resource set for PUSCH transmission for a UL BWP or UL serving cell within the set of cells. For example, indicating whether the first SRS resource set or the second SRS resource set may be used for PUSCH transmission by the UE for a uplink serving cell. The higher layer configuration transmitted at 630 may be transmitted in a separate higher layer signaling message. Alternatively, this procedure of 630 may be combined with 610 and/or 620 when the information may be transmitted in a single higher layer configuration message together with the information of 610 and/or 620.

At 640, for example, the gNB may transmit to the UE, a PUSCH scheduling message using multi-cell DCI format 0_X indicating the UE to transmit PUSCH on one or more cells of the set of cells. At 650, the gNB may determine one of the SRS resource sets for the PUSCH transmission with K repetitions (for K>1 or K≥1) by a UE for UL BWPs/UL serving cells that may be configured with two SRS resource sets in 320. In another example, the gNB may determine the first SRS resource set, which may be the SRS resource set with the lower SRS resource set ID, for PUSCH repetition transmissions on the UL BWP of the serving cell by the UE. In a further example, the gNB may determine the second SRS resource set, which may be the SRS resource set with the higher SRS resource set ID, for PUSCH repetition transmissions on the UL BWP of the serving cell by the UE. In another example, if higher layer signaling on the applicable SRS resource set has been transmitted at 630, the gNB may determine a single applicable SRS resource set from the higher layer signaling information for PUSCH repetition transmissions on the UL BWP of the serving cell.

At 660, the gNB may receive from the UE PUSCH repetitions on one or more serving cells based on the multi-cell scheduling information transmitted at 640 and the determined SRS resource set for each of the cells scheduled with K PUSCH repetitions (for K>1 or K≥1) based on the selected exemplary determination in 650.

FIG. 7 illustrates an example flow diagram of another method, according to some exemplary embodiments. In the exemplary embodiments, the method of FIG. 7 may be performed by a network-entity or a basestation in a 3GPP system, such as LTE or 5G-NR. For instance, in the exemplary embodiments, the method of FIG. 7 may be performed by a gNB similar to apparatus 920 illustrated in FIG. 9.

According to some exemplary embodiments, the method of FIG. 7 may include, at 710, which is similar to 610, the gNB may configure the UE, using higher layer signalling, for example, RRC, for multi-cell PUSCH scheduling using DCI format 0_X within a set of cells. At 720, which is similar to 620, the gNB may configure the UE using higher layer signalling (e.g., RRC) with two different UL SRS resource sets (e.g., SRS resource set #1 and SRS resource set #2) with usage codebook/non-codebook for an UL BWP of at least one of the serving cells of the set of cells. The higher layer configuration of 710 and 720 may be transmitted in a single or separate higher layer configuration messages. According to a UL SRS resource set configuration, the UE may transmit periodically, or semi-persistently or aperiodically, configured SRS resources associated with both resource sets. Based on these UL SRS transmissions by the UE the gNB may select one SRI and one TPMI including precoder matrix index and rank to be indicated via DCI 0_X or to select SRI to be indicated via DCI 0_X. For example, the DCI 0_X may be a multi-cell DCI for codebook based dynamic grant PUSCH transmission and the SRI may include layer(s) and SRS resource indice(s). Further, the DCI 0_X may be a multi-cell DCI for non-codebook based dynamic grant PUSCH transmission for non-codebook based PUSCH transmission.

At 730, the UE may transmit in a higher layer signaling message, such as RRC, to the UE, information on an SRS resource set indicator field definition in DCI format 0_X. As a first example, the higher layer signaling may indicate that either a single 1-bit SRS resource set indicator field with value '0' or '1' may be present in DCI format 0_X applicable to all scheduled UL BWPs/serving cells, or if DCI format 0_X may contain separate 1-bit SRS resource set indicator fields for each of the cells within the set of cells or for each UL serving cells scheduled by a DCI format 0_X. As a second example, the higher layer signaling may indicate an SRS resource set indicator table for a joint applicable SRS resource set indication for DCI format 0_X, such that the number of rows may define a DCI size for the SRS resource set indicator field in DCI format 0_X as ⌈log 2(num_table_rows)⌉ bits and the table may contain a row for each of the UL serving cells within the set of cells or at least for UL serving cells configured with two SRS resources sets in 720. The higher layer configuration of 730 may be transmitted in a separate higher layer signaling message, or may be combined and transmitted in a single higher layer configuration message together with the information of 710 and/or 720.

At 740, the gNB may determine one of the SRS resource sets for the PUSCH transmission with K repetitions (for K>1 or K≥1) by the UE for each UL BWPs/UL serving cells being configured with two SRS resource sets. For a first non-limiting example, the determined SRS resource set may be applicable to all schedule UL BWPs/serving cells. For a second non-limiting example, the SRS resource set is separately determined for each of the UL BWPs/serving cells to be scheduled by a DCI format 0_X. For a third non-limiting example, if in 730 the higher layer signaling is transmitted based on the first example, the determined SRS resource set may be applicable to all schedule UL BWPs/serving cells or the SRS resource set is separately determined for each of the UL BWPs/serving cells to be scheduled by a DCI format 0_X. For a fourth non-limiting example, if in 730 the higher layer signaling is transmitted based on the second example, the SRS resource set for the UL BWPs/serving cells to be scheduled by a DCI format 0_X are determined by determining one row of the SRS resource set indicator table in step 730.

At 750, the gNB may transmit to the UE, a PUSCH scheduling message using DCI format 0_X that may indicate to transmit PUSCH on one or more cells of the set of cells. For a first non-limiting example, the DCI format may include a single 1-bit SRS resource set indicator field with value '0' or '1' to be present in DCI format applicable to all schedule UL BWPs/serving cells. The gNB may indicate to the UE in DCI format 0_X by setting the SRS resource set indicator based on the determination in step 740 to a value of '0' or '1', that the first or the second SRS resource set is to be applied for PUSCH transmission with repetitions by the UE on the UL BWP of all the scheduled serving cell. For a second non-limiting example, the DCI format may include a 1-bit SRS resource set indicator field with value '0' or '1' for each of the cells within the set of cells or for each UL serving cells scheduled by a DCI format 0_X. The gNB may indicate to the UE in DCI format 0_X by setting the SRS resource set indicator of each of the cells based on the determination in step 740 to a value of '0' or '1', that the first or second SRS resource set is to be applied for PUSCH transmission with repetitions by the UE on the UL BWP of the scheduled serving cell. For a third non-limiting example, if in 730 the higher layer signaling is transmitted based on the first example, the DCI format either includes a single 1-bit SRS resource set indicator field with value '0' or '1' to be present in DCI format applicable to all schedule UL BWPs/serving cells or a 1-bit SRS resource set indicator field with value '0' or '1' for each of the cells within the set of cells or for each UL serving cells scheduled by a DCI format 0_X. The gNB may indicate to the UE in DCI format 0_X by setting the single 1-bit SRS resource set indicator or the 1-bit SRS resource set indicator for each scheduled to a value of '0' or '1' based on the determination in step 740. For a fourth non-limiting example, if in 730 the higher layer signaling is transmitted based on the second example, the DCI format may include an SRS resource set indicator field of size of ⌈log 2(num_table_rows)⌉ bits providing a joint indication for the applicable SRS resource set for each of the cells within the set of cells. The gNB may indicate to the UE in DCI format 0_X by setting the SRS resource set indicator to a value corresponding to the determined row of the SRS resource set indicator table in step 740.

At 760, the gNB may receive a PUSCH on one or more serving cells based on the multi-cell scheduling information transmitted at 750 and the determined SRS resource set for each of the cells scheduled with K PUSCH repetitions (for K>1 or K≥1) based on 740.

FIG. 8 illustrates an example flow diagram of a further method, according to certain exemplary embodiments. In the exemplary embodiments, the method of FIG. 8 may be performed by a network-entity, or a base station in a 3GPP system, such as LTE or 5G-NR. For instance, in the exemplary embodiments, the method of FIG. 8 may be performed by a gNB similar to apparatus 920 illustrated in FIG. 9.

According to certain exemplary embodiments, the method of FIG. 8 may include, at 810, which is similar to 610 and/or 710, the gNB may configure the UE using higher layer signalling, for example, RRC, for multi-cell PUSCH scheduling using DCI format 0_X within a set of cells. At 820, which is similar to 620 and/or 720, the gNB may configure the UE using higher layer signalling (e.g., RRC) with two different UL SRS resource sets (e.g., SRS resource set #1 and SRS resource set #2) with usage codebook/non-codebook for an UL BWP of at least one of the serving cells of the set of cells. The higher layer configuration of 810 and 820 may be transmitted in a single or separate higher layer configuration messages. According to a UL SRS resource set configuration, the UE may transmit periodically, or semi-persistently or aperiodically, configured SRS resources associated with both resource sets. Based on these UL SRS transmissions by the UE the gNB may select one SRI and one TPMI including precoder matrix index and rank to be indicated via DCI 0_X or to select SRI to be indicated via DCI 0_X. For example, the DCI 0_X may be a multi-cell DCI for codebook based dynamic grant PUSCH transmission and the SRI may include layer(s) and SRS resource indice(s). Further, the DCI 0_X may be a multi-cell DCI for non-codebook based dynamic grant PUSCH transmission for non-codebook based PUSCH transmission.

At 830, the UE may determine one of the SRS resource sets for the PUSCH transmission with K repetitions (for K>1 or K≥1) by the UE for UL BWPs/UL serving cells being configured with two SRS resource sets. At 840, the gNB may determine a CORESET of a certain coresetPoolIndex based on the determined SRS resource set in step 830 and may transmit to the UE, a PUSCH scheduling message using DCI format 0_X indicating to transmit PUSCH on one or more cells of the set of cells on the determined CORESET. The CORESET of coresetPoolIndex '0' may determined by the gNB if the UE is to apply the first or the second SRS resource set for PUSCH transmission with repetition on the UL BWP of all the scheduled serving cell. The CORESET of coresetPoolIndex '1' may determined by the gNB if the UE is to apply the second or the first SRS resource set for PUSCH transmission with repetitions on the UL BWP of all the scheduled serving cell.

At 850, the gNB may receive from the UE a PUSCH on one or more serving cells based on the multi-cell scheduling information transmitted in 840 and the determined SRS resource set for each of the cells scheduled with K PUSCH repetitions (for K>1 or K≥1) based on 830.

Figure 9:
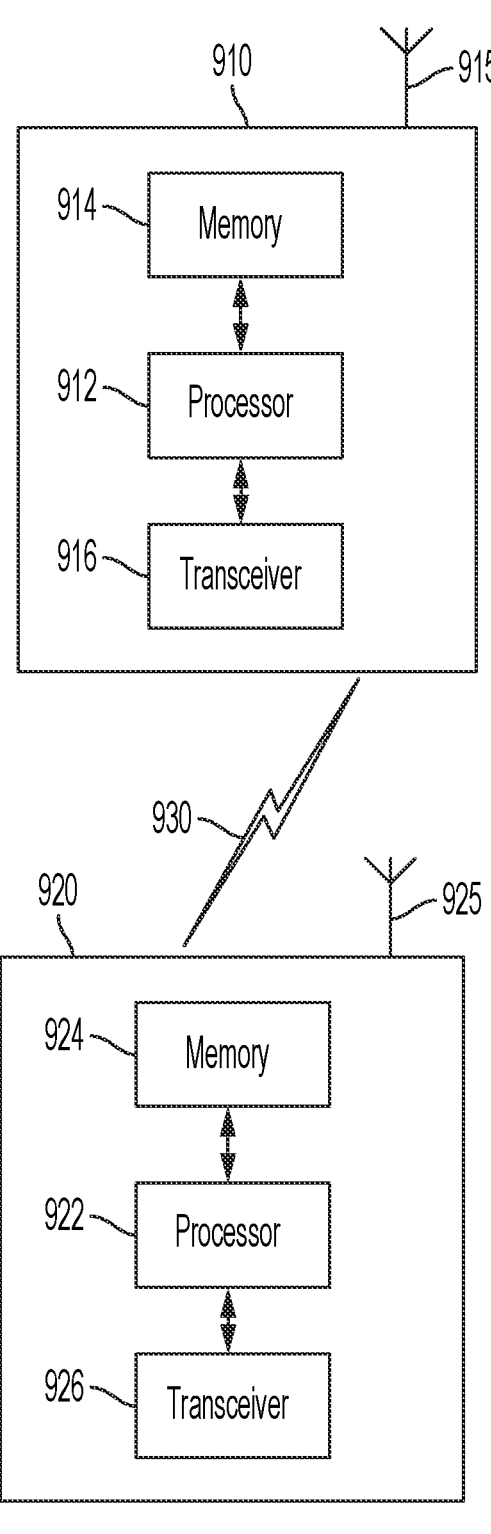
FIG. 9 illustrates a configuration of apparatuses, according to various exemplary embodiments.

FIG. 9 illustrates a set of apparatuses 910 and 920 according to various exemplary embodiments. In the various exemplary embodiments, the apparatus 910 may be an element in a communications network or associated with such a network, such as a UE, RedCap UE, SL UE, mobile equipment (ME), mobile station, mobile device, stationary device, IoT device, or other device. It should be noted that one of ordinary skill in the art would understand that apparatus 910 may include components or features not shown in FIG. 9. In addition, apparatus 920 may be a network, RAN element, or element in a communications network or associated with such a network, such as a base station, an NE, or a gNB. It should be noted that one of ordinary skill in the art would understand that apparatus 920 may include components or features not shown in FIG. 9.

According to various exemplary embodiments, the apparatus 910 may include at least one processor 912, and at least one memory 914, as shown in FIG. 9. The memory 914 may store instructions that, when executed by the processor 912, cause the apparatus 910 to receive, from a network entity similar to apparatus 920 of FIG. 9, a first configuration for multi-cell PUSCH scheduling for a set of cells, and receive a second configuration including at least two UL-SRS resource sets for at least one serving cell of the set of cells, wherein at least two UL SRS resource sets include information relating to usage for codebook and/or non-codebook based physical uplink shared channel transmission. The apparatus may also be caused to receive a PUSCH scheduling message indicating to transmit one or more respective PUSCHs on one or more cells of the set of cells, and determine one SRS resource set of the at least two UL SRS resource sets for the PUSCH transmission including one or more repetitions for each of the at least one serving cell of the set of cells.

According to various exemplary embodiments, the apparatus 920 may include at least one processor 922, and at least one memory 924, as shown in FIG. 9. The memory 924 may store instructions that, when executed by the processor 922, cause the apparatus 920 to transmit, to a element in a communications network or associated with such a network, such as a UE, RedCap UE, SL UE, mobile equipment (ME), mobile station, mobile device, stationary device, IoT device, or other device similar to apparatus 910 of FIG. 9, a first configuration for multi-cell PUSCH scheduling for a set of cells, and transmit a second configuration including at least two UL-SRS resource sets. Each of the at least two UL SRS resource sets includes information relating to usage of codebook for at least one serving cell of the set of cells. The apparatus may also be caused to determine one SRS resource set of the at least two UL SRS resource sets for the PUSCH transmission including one or more repetitions for each of the at least one serving cell of the set of cells and transmit a PUSCH scheduling message indicating to transmit a PUSCH on one or more cells of the set of cells.

In some example embodiments, an apparatus (for example, apparatuses 910 and/or 920) may include means for performing a method, a process, or any of the variants discussed herein. Examples of the means may include one or more processors, memory, controllers, transmitters, receivers, and/or computer program code for causing the performance of the operations.

The apparatus 910 may include means for receiving, from a network entity, a first configuration for multi-cell physical uplink shared channel (PUSCH) scheduling for a set of cells, and means for receiving, from the network entity, a second configuration comprising at least two uplink (UL) sounding reference signal (SRS) resource sets for at least one serving cell of the set of cells, wherein at least two UL SRS resource sets may comprise information relating to usage for codebook and/or non-codebook based physical uplink shared channel transmission. The apparatus may also include receiving, from the network entity, a PUSCH scheduling message indicating for the apparatus to transmit a PUSCH on one or more cells of the set of cells, and determining one SRS resource set of the at least two UL SRS resource sets for the PUSCH transmission including one or more repetitions for the at least one serving cell of the set of cells. The apparatus 920 may include means for transmitting, to an element in a communications network or associated with such a network, such as a UE, similar to 910 of FIG. 9, a first configuration for multi-cell physical uplink shared channel (PUSCH) scheduling for a set of cells, and means for transmitting, to the apparatus 910, a second configuration comprising at least two uplink (UL) sounding reference signal (SRS) resource sets for at least one serving cell of the set of cells, wherein at least two UL SRS resource sets may comprise information relating to usage for codebook and/or non-codebook based physical uplink shared channel transmission. The apparatus may also include a means for determining one SRS resource set of the at least two UL SRS resource sets for the PUSCH transmission with repetitions for the at least one serving cell of the set of cells and transmitting, to the apparatus 910, a PUSCH scheduling message indicating to the device to transmit a PUSCH on one or more cells of the set of cells.

Various exemplary embodiments described above may provide several technical improvements, enhancements, and/or advantages. For instance, in some exemplary embodiments, it may be possible to advantageously provide the capability for a UE or a gNB to be able to perform a procedure related to interpreting an indicated SRS resource set when two UL SRS resource sets are configured with usage codebook/non-codebook without the second SRS resource indicator and/or the second precoding information being available in DCI format 0_X.

In some example embodiments, apparatuses 910 and/or 920 may include one or more processors, one or more computer-readable storage medium (for example, memory, storage, or the like), one or more radio access components (for example, a modem, a transceiver, or the like), and/or a user interface. In some example embodiments, apparatuses 910 and/or 920 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 9, apparatuses 910 and/or 920 may include or be coupled to processors 912 and 922, respectively, for processing information and executing instructions or operations. Processors 912 and 922 may be any type of general or specific purpose processor. In fact, processors 912 and 922 may include one or more of general-purpose computers, special purpose computers, micropro-cessors, digital signal processors (DSPs), field-program-mable gate arrays (FPGAs), application-specific integrated circuits (ASICs), and processors based on a multi-core processor architecture, as examples. While a single proces-sor 912 (and 922) for each of apparatuses 910 and/or 920 is shown in FIG. 9, multiple processors may be utilized according to other example embodiments. For example, it should be understood that, in certain example embodiments, apparatuses 910 and/or 920 may include two or more processors that may form a multiprocessor system (for example, in this case processors 912 and 922 may represent a multiprocessor) that may support multiprocessing. Accord-ing to certain example embodiments, the multiprocessor system may be tightly coupled or loosely coupled to, for example, form a computer cluster.

Processors 912 and 922 may perform functions associated with the operation of apparatuses 910 and/or 920, respec-tively, including, as some examples, precoding of antenna gain/phase parameters, encoding and decoding of individual bits forming a communication message, formatting of infor-mation, and overall control of the apparatuses 910 and/or 920, including processes illustrated in FIGS. 3-8.

Apparatuses 910 and/or 920 may further include or be coupled to memory 914 and/or 924 (internal or external), respectively, which may be coupled to processors 912 and 922, respectively, for storing information and instructions that may be executed by processors 912 and 922. Memory 914 (and memory 924) may be one or more memories and of any type suitable to the local application environment, and may be implemented using any suitable volatile or nonvolatile data storage technology such as a semiconduc-tor-based memory device, a magnetic memory device and system, an optical memory device and system, fixed memory, and/or removable memory. For example, memory 914 (and memory 924) can be comprised of any combina-tion of random access memory (RAM), read only memory (ROM), static storage such as a magnetic or optical disk, hard disk drive (HDD), or any other type of non-transitory machine or computer readable media. The instructions stored in memory 914 and memory 924 may include pro-gram instructions or computer program code that, when executed by processors 912 and 922, enable the apparatuses 910 and/or 920 to perform tasks as described herein.

In certain example embodiments, apparatuses 910 and/or 920 may further include or be coupled to (internal or external) a drive or port that is configured to accept and read an external computer readable storage medium, such as an optical disc, USB drive, flash drive, or any other storage medium. For example, the external computer readable stor-age medium may store a computer program or software for execution by processors 912 and 922 and/or apparatuses 910 and/or 920 to perform any of the methods illustrated in FIGS. 3-8.

In some exemplary embodiments, apparatuses 910 and/or 920 may also include or be coupled to one or more antennas 915 and 925, respectively, for receiving a downlink signal and for transmitting via an uplink from apparatuses 910 and/or 920. Apparatuses 910 and/or 920 may further include transceivers 916 and 926, respectively, configured to trans-mit and receive information. The transceivers 916 and 926 may also include a radio interface (for example, a modem) respectively coupled to the antennas 915 and 925. The radio interface may correspond to a plurality of radio access technologies including one or more of GSM, LTE, LTE-A, 5G, NR, WLAN, NB-IoT, Bluetooth, BT-LE, NFC, RFID, UWB, or the like. The radio interface may include other components, such as filters, converters (for example, digital-to-analog converters or the like), symbol demappers, signal shaping components, an Inverse Fast Fourier Transform (IFFT) module, or the like, to process symbols, such as OFDMA symbols, carried by a downlink or an uplink.

For instance, transceivers 916 and 926 may be respec-tively configured to modulate information on to a carrier waveform for transmission by the antenna(s) 915 and 925, and demodulate information received via the antenna(s) 915 and 925 for further processing by other elements of appa-ratuses 910 and/or 920. In other example embodiments, transceivers 916 and 926 may be capable of transmitting and receiving signals or data directly. Additionally or alterna-tively, in some example embodiments, apparatuses 910 and/or 920 may include an input and/or output device (I/O device). In certain example embodiments, apparatuses 910 and/or 920 may further include a user interface, such as a graphical user interface or touchscreen.

In certain example embodiments, memory 914 and memory 924 store software modules that provide function-ality when executed by processors 912 and 922, respec-tively. The modules may include, for example, an operating system that provides operating system functionality for apparatuses 910 and/or 920. The memory may also store one or more functional modules, such as an application or program, to provide additional functionality for apparatuses 910 and/or 920. The components of apparatuses 910 and/or 920 may be implemented in hardware, or as any suitable combination of hardware and software. According to certain example embodiments, apparatus 910 may optionally be configured to communicate with apparatus 920 via a wire-less or wired communications link 930 according to any radio access technology, such as NR.

According to certain example embodiments, processors 912 and 922, and memory 914 and 924 may be included in or may form a part of processing circuitry or control circuitry. In addition, in some example embodiments, trans-ceivers 916 and 926 may be included in or may form a part of transceiving circuitry.

As used herein, the term "circuitry" may refer to hard-ware-only circuitry implementations (for example, analog and/or digital circuitry), combinations of hardware circuits and software, combinations of analog and/or digital hard-ware circuits with software/firmware, any portions of hard-ware processor(s) with software, including digital signal processors, that work together to cause an apparatus (for example, apparatus 910 and/or 920) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor or multiple processors, or portion of a hardware circuit or processor, and the accom-panying software and/or firmware. The term circuitry may also cover, for example, a baseband integrated circuit in a server, cellular network node or device, or other computing or network device.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (for example, apparatuses 910 and/or 920), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
BWP Bandwidth Part
CORESET Control Resource Set
DCI Downlink Control Information
DL Downlink
EMBB Enhanced Mobile Broadband
gNB 5G or Next Generation NodeB
LTE Long Term Evolution
M-TRP Multi-Transmission-Reception Point
MC-DCI Multi-Cell DCI
NR New Radio
NE Network Entity
PDSCH Physical Downlink Shared Channel
PUSCH Physical Uplink Shared Channel
RRC Radio Resource Control
SRS Sounding Reference Signal
UE User Equipment
UL Uplink

We claim:

1. An apparatus, comprising:

at least one processor; and at least one memory storing instructions that, when executed by the at least one processor, cause the apparatus at least to:

receive, from a network entity, a first configuration for multi-cell physical uplink shared channel scheduling for a set of cells;

receive, from the network entity, a second configuration comprising at least two uplink sounding reference signal resource sets for at least one serving cell of the set of cells, wherein at least two uplink sounding reference signal resource sets comprises information relating to usage for codebook and/or non-codebook based physical uplink shared channel transmission;

receive, from the network entity, a physical uplink shared channel scheduling message indicating for the apparatus to transmit one or more respective physical uplink shared channels on one or more cells of the set of cells; and determine one sounding reference signal resource set of the at least two uplink sounding reference signal resource sets for the physical uplink shared channel transmission including one or more repetitions for the at least one serving cell of the set of cells, wherein the one sounding reference signal resource set is determined based on a control resource set pool index on which a downlink control information format scheduling the physical uplink shared channels on the respective one or more cells of the set of cells has been received on, wherein:

when the scheduling downlink control information format is received on a control resource set of a first index value, the apparatus is further caused to determine a first sounding reference signal resource set to be applied for physical uplink shared channel transmission including one or more repetitions on an uplink bandwidth part of all the scheduled serving cell; or when the scheduling downlink control information format is received on a control resource set of a second index value, the apparatus is further caused to determine a second sounding reference signal resource set to be applied for physical uplink shared channel transmission including one or more repetitions on the uplink bandwidth part of all the scheduled serving cell.

2. The apparatus according to claim 1, wherein the one sounding reference signal resource set is determined based on a higher layer signaling message from the network entity, which comprises information on a sounding reference signal resource set to be used for physical uplink shared channel transmission including one or more repetitions.

3. The apparatus according to claim 2, wherein the higher layer signaling message indicates the sounding reference signal resource set to be used for an uplink bandwidth part or uplink serving cell of the set of cells.

4. The apparatus according to claim 1, wherein the apparatus is further caused to:

determine that the one sounding reference signal resource set is a first sounding reference signal resource set to be used for the physical uplink shared channel transmission including one or more repetitions on the serving cell.

5. The apparatus according to claim 1, wherein the apparatus is further caused to:

determine that the one sounding reference signal resource set is a second sounding reference signal resource set to be used for the physical uplink shared channel transmission including one or more repetitions on the serving cell.

6. An apparatus, comprising:

at least one processor; and at least one memory storing instructions that, when executed by the at least one processor, cause the apparatus at least to:

transmit, to a user device, a first configuration for multi-cell physical uplink shared channel scheduling for a set of cells;

transmit, to the user device, a second configuration comprising at least two uplink sounding reference signal resource sets for at least one serving cell of the set of cells, wherein at least two uplink sounding reference signal resource sets comprises information relating to usage for codebook and/or non-codebook based physical uplink shared channel transmission;

determine one sounding reference signal resource set of the at least two uplink sounding reference signal resource sets for the physical uplink shared channel transmission including one or more repetitions for the at least one serving cell of the set of cells; and transmit, to the user device, a physical uplink shared channel scheduling message indicating for the user device to transmit one or more respective physical uplink shared channels on one or more cells of the set of cells, wherein physical uplink shared channel scheduling message includes an indication of the determined one sounding reference signal resource set using at least one downlink control information field in a downlink control information format scheduling the one or more physical uplink shared channels, wherein:

the downlink control information format comprises a single 1-bit downlink control information field to apply to all scheduled uplink bandwidth parts or serving cells of the set of cells; or the downlink control information format comprises a 1-bit downlink control information field for each of the serving cells within the set of cells or for each serving cells scheduled by the downlink control information format; or the downlink control information format, based on higher layer signaling, comprises either a single 1-bit downlink control information field to apply to all scheduled uplink bandwidth parts or serving cells of the set of cells or a 1-bit downlink control information field for each of the serving cells within the set of cells or for each serving cells scheduled by the downlink control information format; or the downlink control information format comprises a downlink control information field having a size according to $[\log 2(num\_table\_rows)]$ bits, providing a joint indication of the applicable sounding reference signal resource set for each serving cell scheduled by the downlink control information format based on a higher layer configured sounding reference signal resource set table containing num_table_rows rows of combinations of applicable sounding reference signal sets for serving cells of the set of cells.

7. The apparatus according to claim 6, wherein the one sounding reference signal resource set is determined based on a higher layer signaling message by the apparatus, which comprises information on a sounding reference signal resource set to be used for physical uplink shared channel transmission including one or more repetitions.

8. The apparatus according to claim 7, wherein the higher layer signaling message indicates the sounding reference signal resource set to be used for an uplink bandwidth part or uplink serving cell of the set of cells.

9. The apparatus according to claim 6, wherein the apparatus is further caused to:

determine that the one sounding reference signal resource set is a first sounding reference signal resource set to be used for the physical uplink shared channel transmission including one or more repetitions on the serving cell.

10. The apparatus according to claim 6, wherein the apparatus is further caused to: determine that the one sounding reference signal resource set is a second sounding reference signal resource set to be used for the physical uplink shared channel transmission including one or more repetitions on the serving cell.

11. The apparatus according to claim 6, wherein the downlink control information format scheduling the one or more physical uplink shared channels on one or more cells of the set of cells is transmitted on a control resource set pool index determined based on the determined one sounding reference signal resource set.

12. The apparatus according to claim 11, wherein:

when the apparatus determined a first sounding reference signal resource set to be applied for physical uplink shared channel transmission including one or more repetitions on an uplink bandwidth part of all the scheduled serving cells, the scheduling downlink control information format is transmitted on a control resource set of a first index value; or when the apparatus determined a second sounding reference signal resource set to be applied for physical uplink shared channel transmission including one or more repetitions on the uplink bandwidth part of all the scheduled serving cell, the scheduling downlink control information format is transmitted on a control resource set of a second index value.

13. An apparatus, comprising:

at least one processor; and at least one memory storing instructions that, when executed by the at least one processor, cause the apparatus at least to:

receive, from a network entity, a first configuration for multi-cell physical uplink shared channel scheduling for a set of cells;

receive, from the network entity, a second configuration comprising at least two uplink sounding reference signal resource sets for at least one serving cell of the set of cells, wherein at least two uplink sounding reference signal resource sets comprises information relating to usage for codebook and/or non-codebook based physical uplink shared channel transmission;

receive, from the network entity, a physical uplink shared channel scheduling message indicating for the apparatus to transmit one or more respective physical uplink shared channels on one or more cells of the set of cells; and determine one sounding reference signal resource set of the at least two uplink sounding reference signal resource sets for the physical uplink shared channel transmission including one or more repetitions for the at least one serving cell of the set of cells, wherein the one sounding reference signal resource set is determined based on an indication using at least one a downlink control information field in a downlink control information format scheduling the one or more physical uplink shared channels, wherein:

the downlink control information format comprises a single 1-bit downlink control information field to apply to all scheduled uplink bandwidth parts or serving cells of the set of cells; or the downlink control information format comprises a 1-bit downlink control information field for each of the serving cells within the set of cells or for each serving cells scheduled by the downlink control information format; or the downlink control information format, based on higher layer signaling, comprises either a single 1-bit downlink control information field to apply to all scheduled uplink bandwidth parts or serving cells of the set of cells or a 1-bit downlink control information field for each of the serving cells within the set of cells or for each serving cells scheduled by the downlink control information format; or the downlink control information format comprises a downlink control information field having a size according to [log 2(num_table_rows)] bits, wherein the bits provide a joint indication of the applicable sounding reference signal resource set for each serving cell scheduled by the downlink control information format based on a higher layer configured sounding reference signal resource set table containing num_table_rows rows of combinations of applicable sounding reference signal sets for serving cells of the set of cells.

* * * * *